(12) United States Patent
Kalliske et al.

(10) Patent No.: US 7,537,073 B2
(45) Date of Patent: May 26, 2009

(54) HINGE FOR CONNECTING A HOOD, ESPECIALLY AN ENGINE HOOD, TO A VEHICLE BODY

(75) Inventors: Ingo Kalliske, Potsdam (DE); Dieter Markfort, Berlin (DE); Markus Felke, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 228 days.

(21) Appl. No.: 10/534,064

(22) PCT Filed: Oct. 27, 2003

(86) PCT No.: PCT/DE03/03597

§ 371 (c)(1),
(2), (4) Date: Oct. 11, 2005

(87) PCT Pub. No.: WO2004/041601

PCT Pub. Date: May 21, 2004

(65) Prior Publication Data

US 2006/0151221 A1    Jul. 13, 2006

(30) Foreign Application Priority Data

Nov. 6, 2002 (DE) ................................ 102 52 285

(51) Int. Cl.
*B60R 21/34* (2006.01)
(52) U.S. Cl. ................. 180/69.24; 180/69.21; 180/274; 296/187.04; 16/222
(58) Field of Classification Search ................ 180/69.2, 180/69.24, 69.21, 274; 280/730.1; 296/1.04, 296/187.04; 16/222, 254, 260, 262, 229, 16/271, 357
See application file for complete search history.

(56) References Cited

U.S. PATENT DOCUMENTS

| 6,182,782 | B1 * | 2/2001 | Matsuura et al. ............. 180/274 |
| 6,257,657 | B1 * | 7/2001 | Sasaki .................... 296/187.09 |
| 6,330,734 | B1 * | 12/2001 | Cho ............................. 16/376 |
| 6,513,617 | B2 * | 2/2003 | Sasaki et al. ................. 180/274 |
| 6,554,093 | B2 * | 4/2003 | Sasaki et al. ................. 180/274 |

(Continued)

FOREIGN PATENT DOCUMENTS

EP    0 967 128 A2    12/1999

(Continued)

OTHER PUBLICATIONS

Office Action issued by Japanese Intellectual Property Office dated May 23, 2008 for Japanese patent application 2004-549070.

*Primary Examiner*—John Q. Nguyen
*Assistant Examiner*—Karen Amores
(74) *Attorney, Agent, or Firm*—Foley & Lardner LLP

(57) ABSTRACT

A hinge for connecting a hood, especially an engine hood, to a vehicle body, having a least one hinge carrier arranged on the vehicle body, at least one hinge arm arranged on the hood and at least one connecting part for the pivotable connection of the hinge arm to the hinge carrier. The connection of the hinge arm to the hinge carrier is released in the event of an accident by removal and/or destruction of the connecting part. The connecting part is configured to be removed and/or destroyed by forces acting in a direction of a pivot axis of the hinge, in the event of an accident.

22 Claims, 9 Drawing Sheets

U.S. PATENT DOCUMENTS

Figure 1:
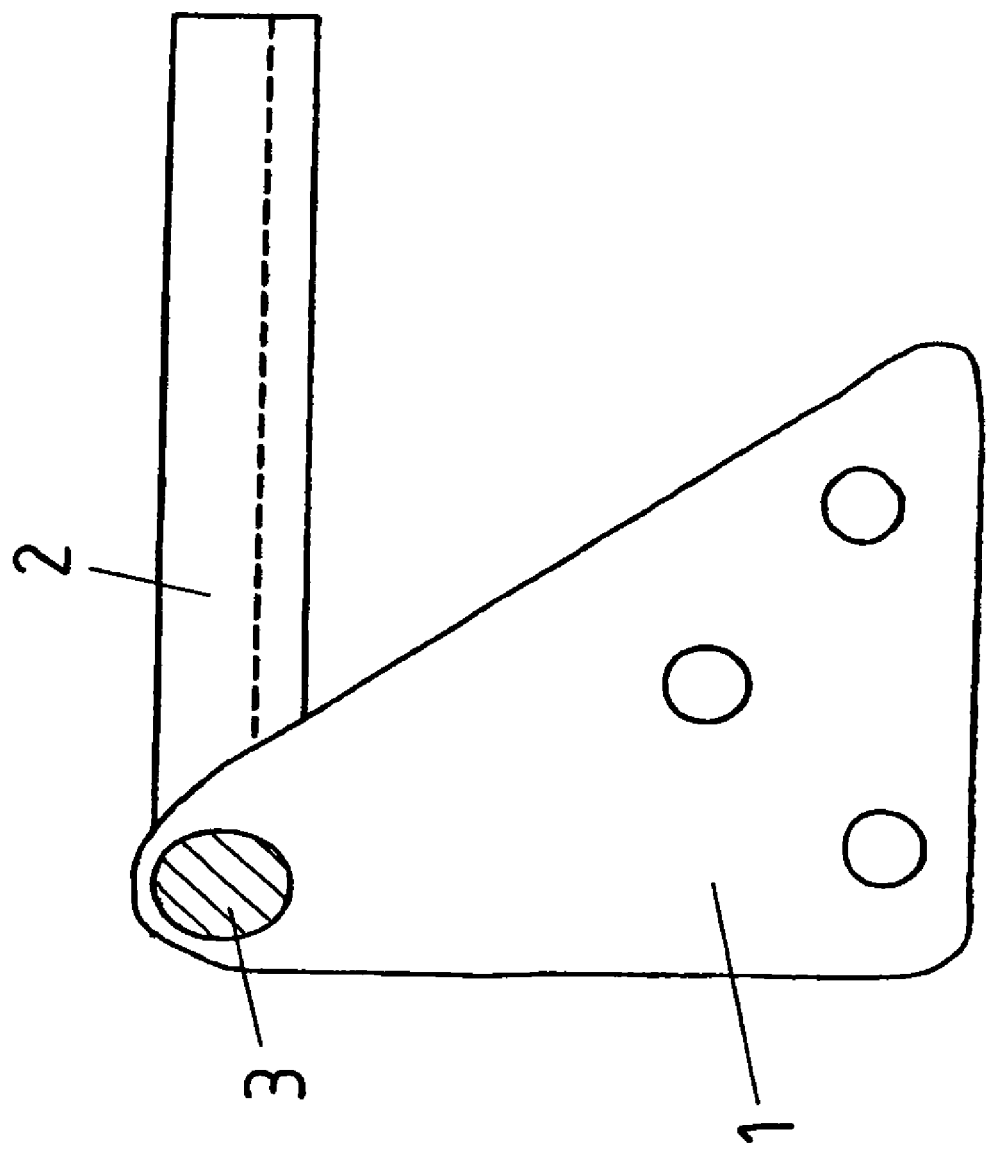

| | | | |
|---|---|---|---|
| 6,668,962 B2 * | 12/2003 | Son | 180/274 |
| 6,857,495 B2 * | 2/2005 | Sawa | 180/274 |
| 6,883,557 B1 * | 4/2005 | Eschbach et al. | 139/387 R |
| 6,934,999 B2 * | 8/2005 | Kreth et al. | 16/222 |
| 6,938,715 B2 * | 9/2005 | Hamada et al. | 180/274 |
| 7,207,406 B1 * | 4/2007 | Polz et al. | 180/69.21 |
| 7,303,040 B2 * | 12/2007 | Green et al. | 180/274 |
| 2002/0011365 A1 * | 1/2002 | Sasaki et al. | 180/69.2 |
| 2002/0043418 A1 * | 4/2002 | Lee | 180/274 |
| 2002/0060447 A1 * | 5/2002 | Acker et al. | 280/730.1 |
| 2003/0001366 A1 * | 1/2003 | Debler et al. | 280/732 |
| 2004/0080146 A1 * | 4/2004 | Lutz et al. | 280/736 |
| 2004/0195810 A1 * | 10/2004 | Dietze et al. | 280/732 |
| 2005/0248184 A1 * | 11/2005 | Piffaretti | 296/187.03 |
| 2007/0075532 A1 * | 4/2007 | Yokoyama et al. | 280/730.2 |
| 2007/0267892 A1 * | 11/2007 | Scheuch et al. | 296/187.04 |
| 2008/0042461 A1 * | 2/2008 | Schafer | 296/1.04 |

FOREIGN PATENT DOCUMENTS

| | | | |
|---|---|---|---|
| EP | 2 368 562 A1 | | 5/2002 |
| GB | 2 372 536 A | | 8/2002 |
| JP | 58-211975 | | 12/1983 |
| JP | 7-267145 | | 10/1995 |
| JP | 11-99906 A | | 4/1999 |
| JP | 11-310157 | | 11/1999 |
| JP | 2000-79859 | | 3/2000 |
| JP | 2002-068019 A | | 3/2002 |
| JP | 2006240558 A | * | 9/2006 |
| JP | 2007062431 A | * | 3/2007 |
| WO | WO 00/69704 | | 11/2000 |
| WO | PCT/SE03/00538 | * | 10/2003 |

* cited by examiner

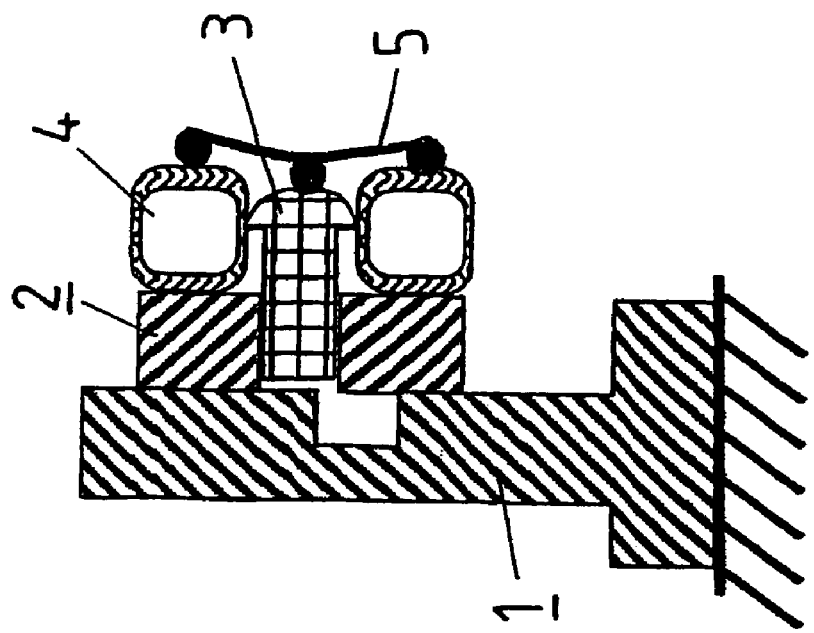
FIG 4
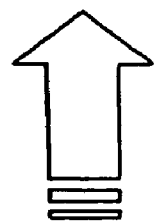
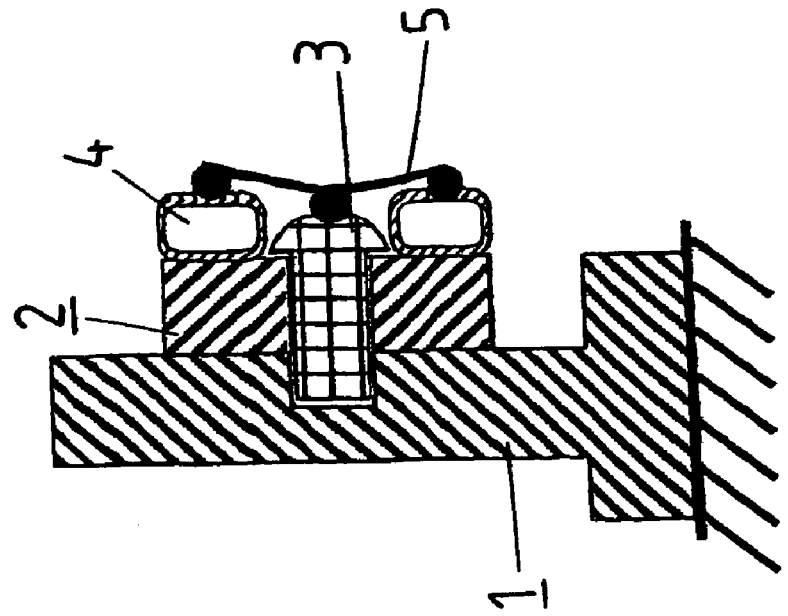

FIG 6
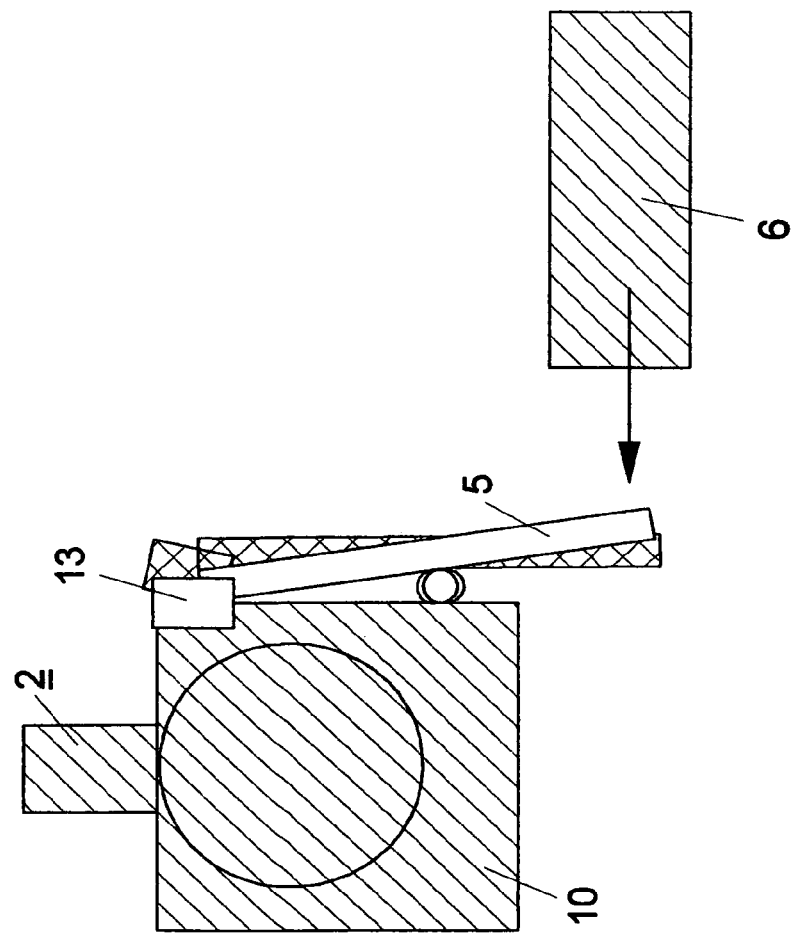
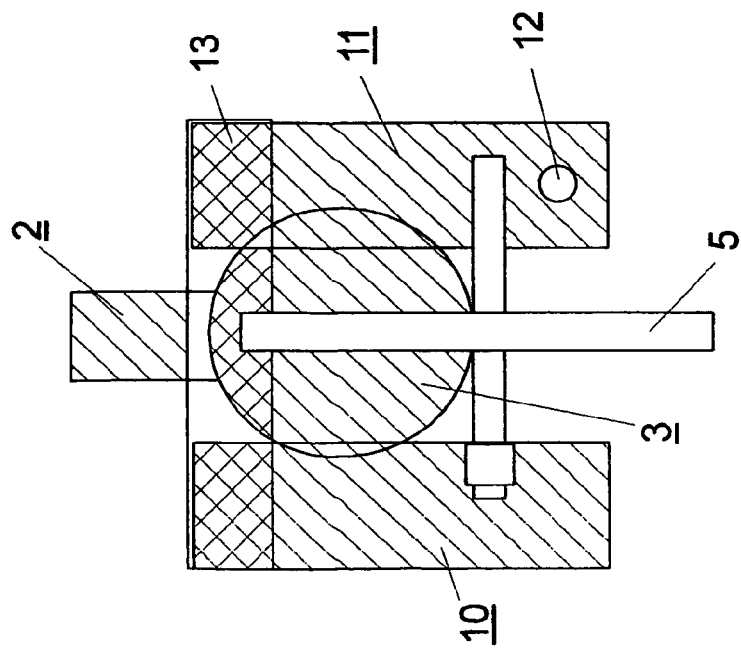

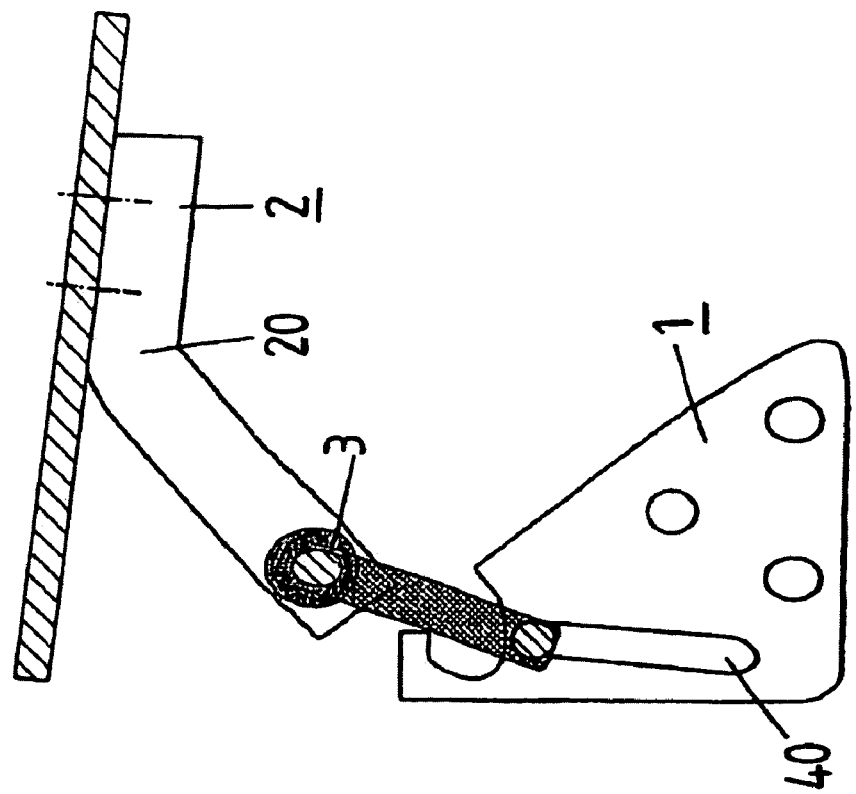
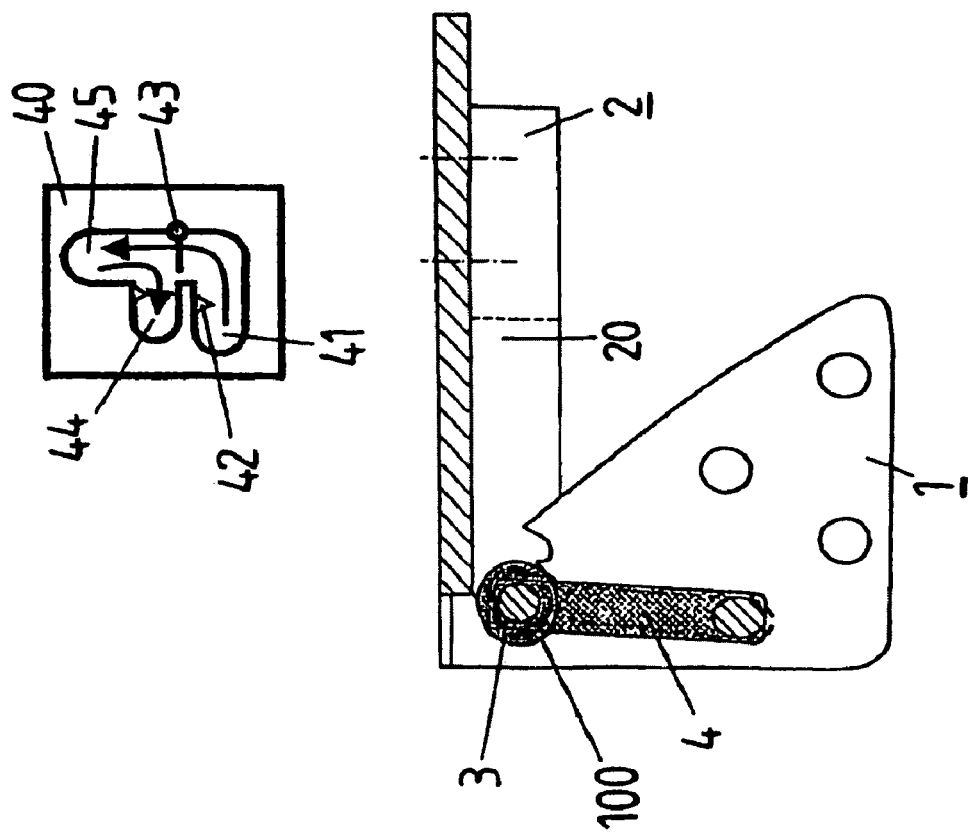
FIG 7

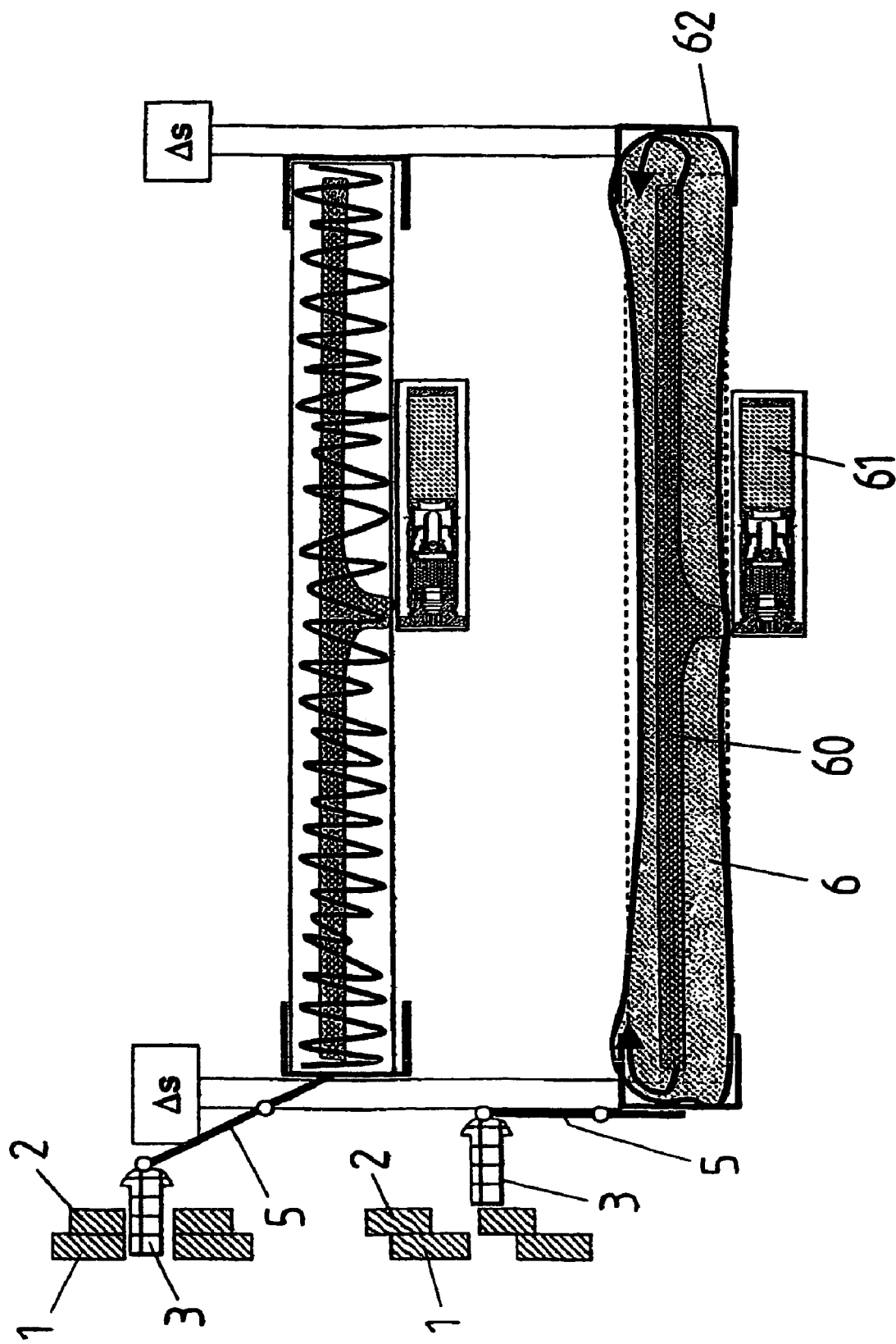

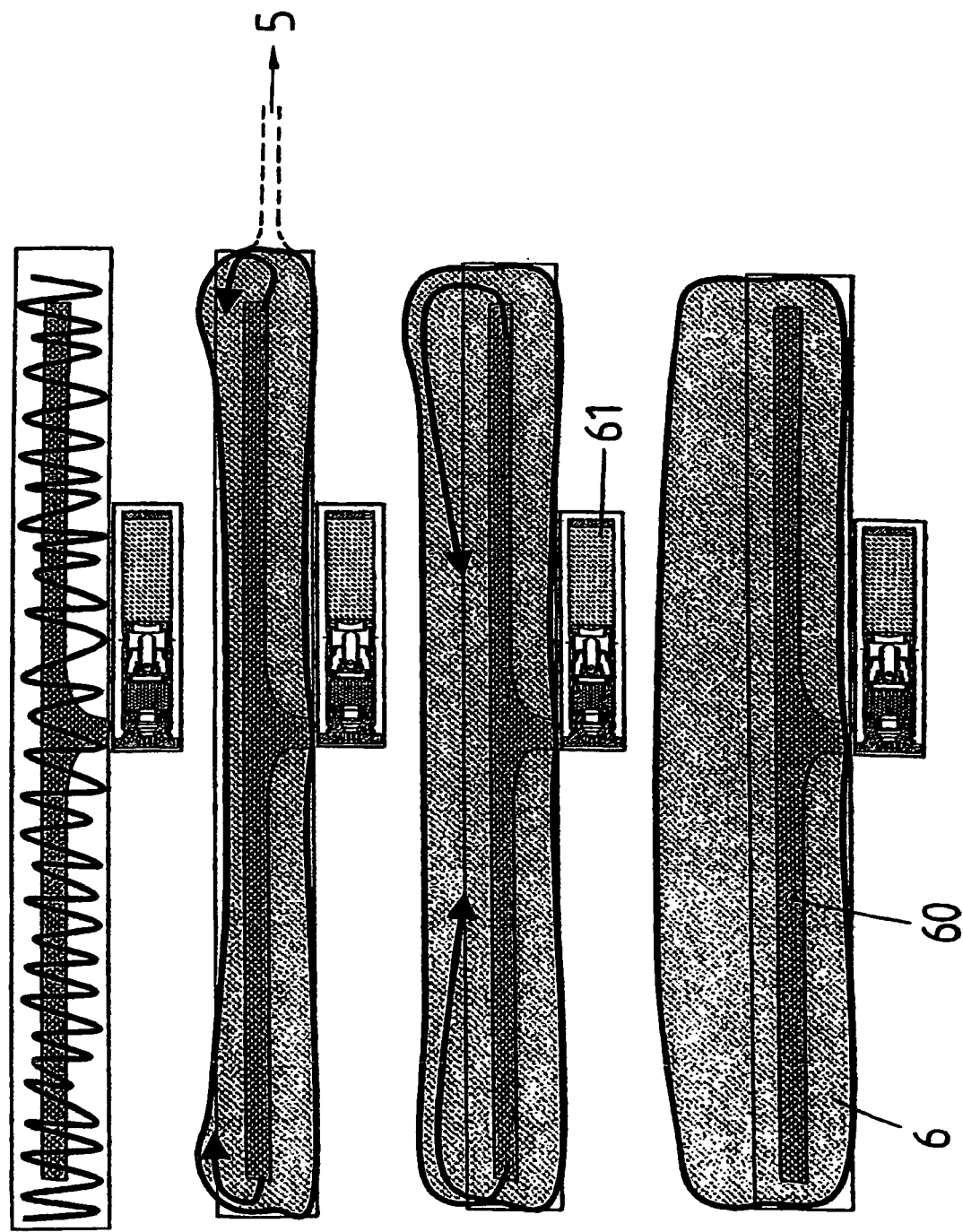

HINGE FOR CONNECTING A HOOD, ESPECIALLY AN ENGINE HOOD, TO A VEHICLE BODY

BACKGROUND

The invention relates to a hinge for connecting a hood, especially an engine hood, to a vehicle body and to an airbag for opening a hood connected by a hinge to a vehicle body.

SUMMARY

Different measures have been proposed in order to protect pedestrians in the event of accidents with motor vehicles. There are various approaches to reducing the loads to which a pedestrian's head is subjected when he impacts against a motor vehicle. Currently known, active systems are focused on raising the engine hood in the region of the cowl. This makes it possible, by deformation of the engine hood, for energy from the pedestrian involved in the accident to be dissipated without him coming into contact with rigid parts situated under the engine hood. However, the engine hood is conventionally connected to the vehicle body in the region of the cowl via a hinge.

It is therefore the object of the present invention to specify a hinge which makes improved protection for pedestrians possible.

The object is achieved by a hinge.

Accordingly, the hinge for connecting a hood, especially an engine hood, to a vehicle body is designed in such a manner that the hood is released from the hinge in the event of an accident, especially with a pedestrian.

The object is furthermore achieved by a hinge for connecting a hood, having at least one hinge carrier arranged on the vehicle body, at least one hinge arm arranged on the hood and at least one connecting part for the pivotable connection of the hinge arm to the hinge carrier, the connection of the hinge arm to the hinge carrier being released in the event of an accident by the connecting part.

DETAILED DESCRIPTION

In this case, the engine hood hinge can be released by complete separation of the engine hood and vehicle body, with, in this case, a device which limits the movement of the engine hood additionally having to be provided. On the other hand, the release of the engine hood hinge can be brought about by only parts of the hinge connection being released, so that there is not a complete separation between the engine hood and vehicle body, with the desired freedom of movement during the raising of the engine hood nevertheless being provided. In this case, the movement of the engine hood can likewise be limited by the non-separated connection.

Various options are described for releasing the hood, especially the engine hood, from the vehicle body. These principles include, among others, the use of an explosive screw (pyrotechnically), the use of shear pins and the use of an airbag for releasing the hinge. In the case of using shear pins with an airbag being used to raise the engine hood, it is expedient to introduce the airbag forces as close to the hinge as possible in order to enable an efficient and low-vibration shearing off of the shear pins. The expansion of the airbag can be used to exert tensile or shearing forces on a connecting element connecting the two hinge parts, in particular a bolt, this bolt then being disengaged from at least one of the two other hinge parts by the forces exerted.

In the case of complete separation of the engine hood in the hinge region from the vehicle body, further measures have to be taken so that the engine hood, after release from the hinge, does not exhibit uncontrolled behavior and could possibly be a risk to a pedestrian. For example, rebound straps may be used here, in which case the expansion behavior of the rebound straps and additional rip seams placed in the rebound strap may contribute to the engine hood moving as gently as possible at a defined force level into its erected end position. This enables vibrations of the engine hood in association with the erection thereof to be reduced and the period of time for damping unavoidable vibrations to be reduced.

By means of a complete or partial release of the hinge connection, a movement of the engine hood about a rotation point on the vehicle front is possible. Inadvertent damage to the engine hood, the hinge and the adjacent vehicle regions can thus be minimized. In order to optimize the rotation point of the engine hood in the front vehicle region, it may be necessary to provide additional devices which render the engine hood pivotable in the event of an accident. In this case, the rotation point may be shifted, for example by means of a lever mechanism, in such a manner that the engine hood is freely pivotable in the desired region without striking against remaining vehicle regions.

The invention is explained in brief below with reference to the drawings of the figures.

FIG. 1 shows a general hinge construction, the hinge being composed of a hinge carrier 1, which is usually connected to the vehicle body, a hinge arm 2, which is usually connected to the engine hood, and a connecting part in the form of a hinge bolt 3. The hinge arm 2 is pivotable in relation to the hinge carrier 1 about the axis of the hinge bolt 3.

Figure 2:
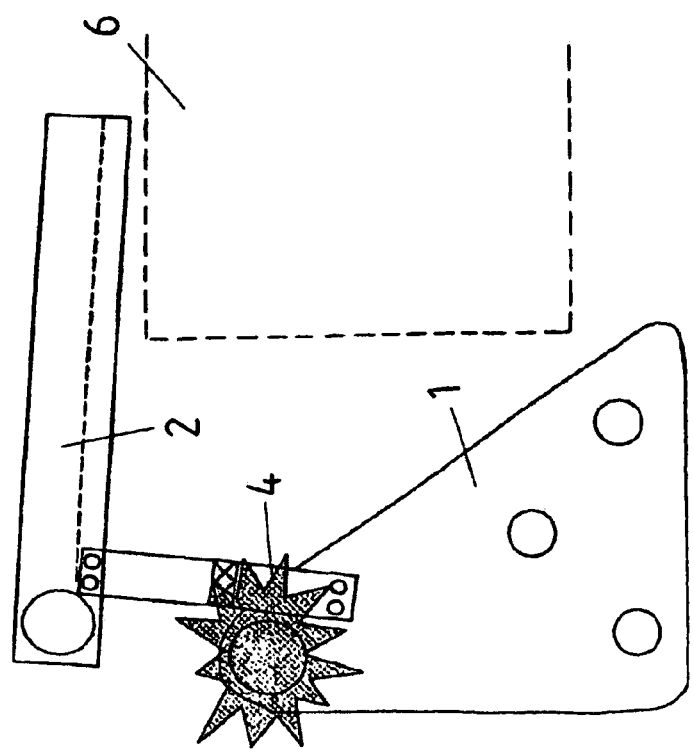

FIG. 2 shows a hinge according to the invention in a state in which the separation of the engine hood and vehicle body from the hinge has already been completed. The hinge bolt 3 was replaced here by an explosive bolt, so that the connection between the hinge arm 2 and the hinge carrier 1 is separated by the explosive bolt blasting off. In the state shown in FIG. 2, an airbag 6 situated under the engine hood, which is connected to the hinge arm 2, has already lifted off the hinge arm from the hinge carrier. The movement of the hinge arm 2 in relation to the hinge carrier 1 is limited by a rebound strap 4 which is arranged between the hinge carrier and hinge arm. The rebound strap firstly has rip seams and is secondly of elastic design, so that, upon deployment of the airbag 6, the engine hood is transferred relatively gently into its end state and vibrations of the engine good are therefore avoided.

Figure 3:
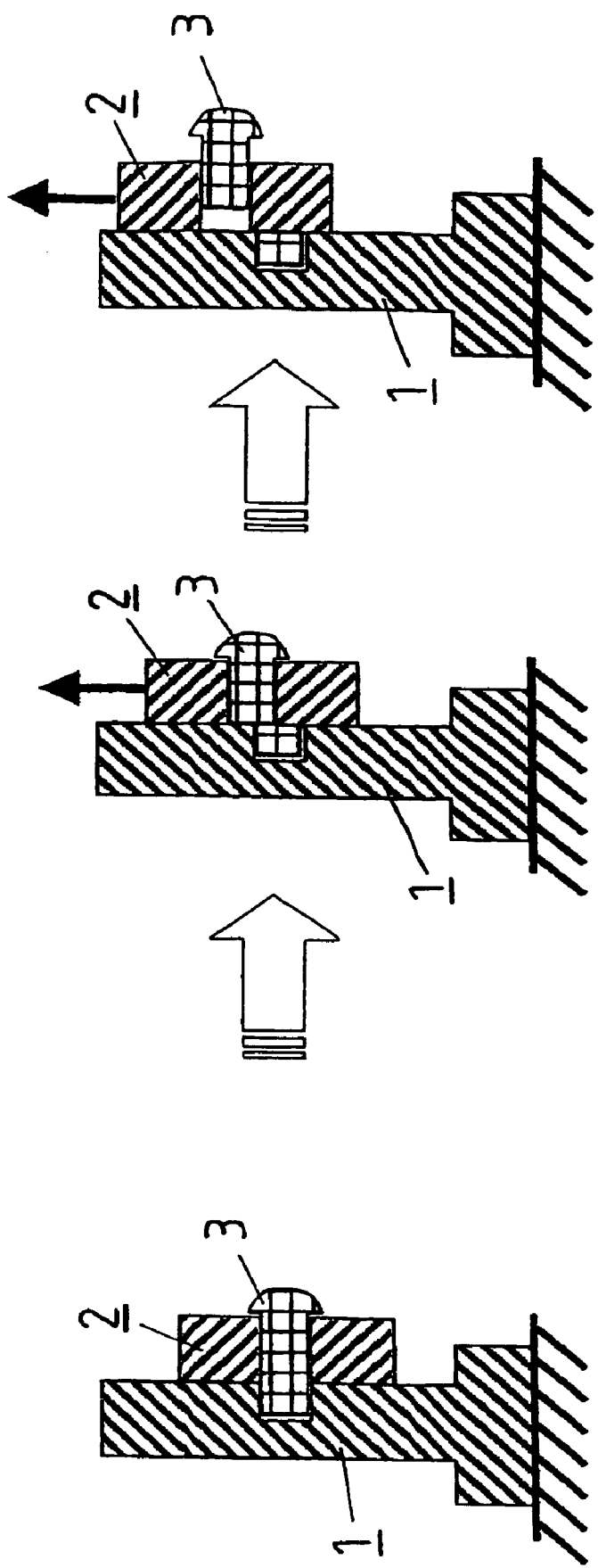

FIG. 3 shows a further embodiment of the hinge according to the invention. In this case, the hinge arm 2 is connected to the hinge carrier 1 via a shear pin 3. In the event of the deployment of the airbag (not shown here), the shear pin 3 is sheared off by the forces exerted by the airbag, so that the connection between the hinge arm 2 and the hinge carrier 1 is eliminated. The engine hood can thus be transferred into its open position.

FIG. 4 shows a further embodiment of the hinge according to the invention. In this case, the connecting part in the form of a bolt 3 is connected to an airbag bypass 4 via a transmission element 5. If the airbag is ignited, then the elastic airbag bypass 4 expands and, via the transmission element 5, pulls the bolt 3 out of its original position. The hinge carrier 1 and connecting arm 2 are therefore released from each other.

Figure 5:
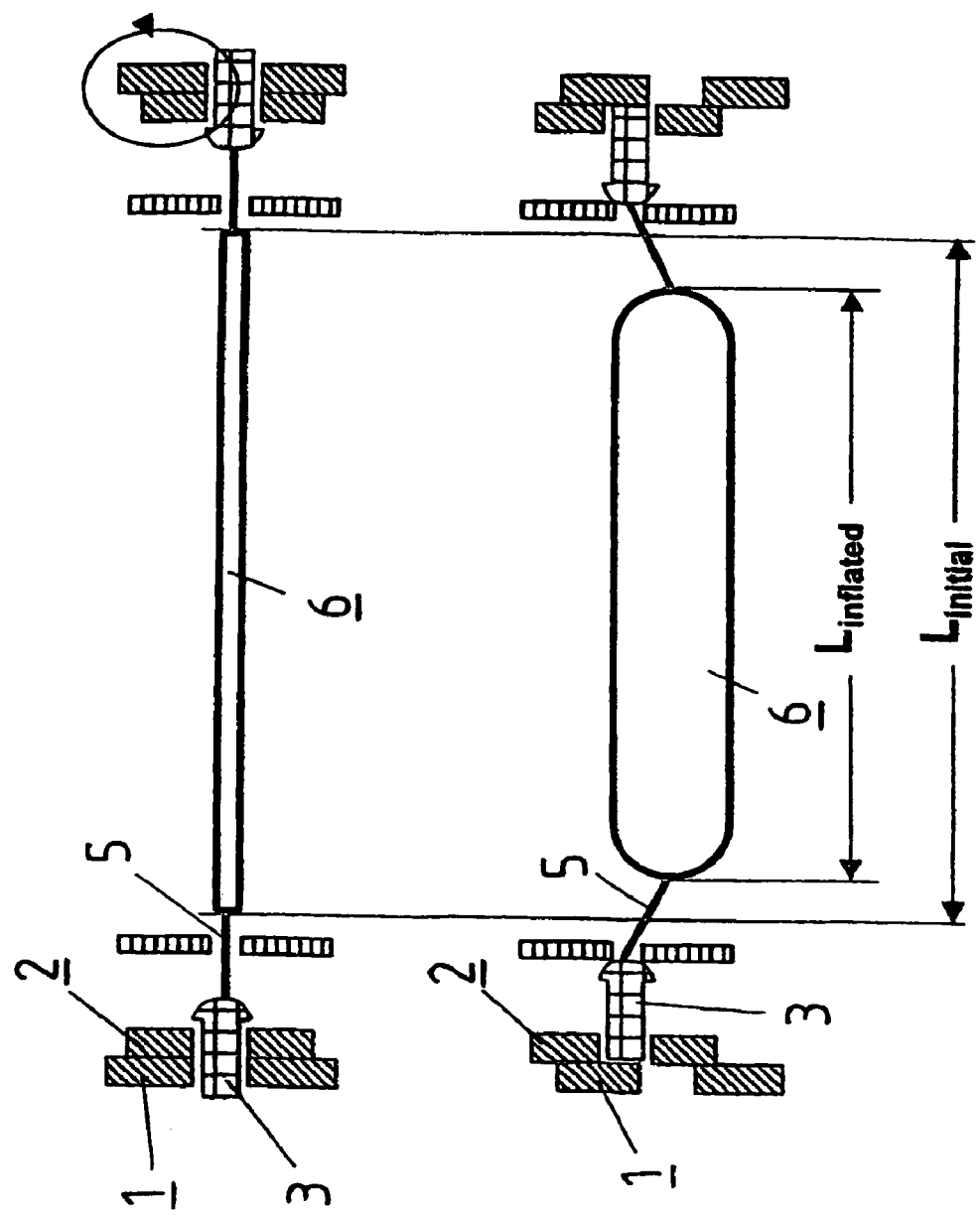

FIG. 5 shows an embodiment of the hinge according to the invention, in which the airbag 6 is longer in its original state than in its inflated state. The airbag 6 is connected to the bolt 3 of the hinge via a transmission element 5. If the airbag 6 is inflated, its original length is shortened and the bolt 3 is pulled out of its connection via the transmission element 5, as a result of which the hinge arm 2 and hinge carrier 1 are released from each other. The bolt 3 may be pretensioned here by a spring, in the same manner as in the embodiment shown in FIG. 4. When the airbag relaxes, the bolt will therefore snap back again into its original position.

FIG. 6 shows a hinge according to the invention in the form of a ball and socket hinge. The connecting part 3 is designed here in the form of a ball which is fitted directly onto the hinge arm 2. The spherical connecting part 3 is accommodated in a two-part hinge carrier which comprises a fixed part 10 and a part 11 which can be pivoted about an axis 12. The spherical connecting part 3 is accommodated in this case in corresponding sockets on the hinge carrier parts 10 and 11. The hinge carrier parts 10, 11 are connected to each other via a clamp 13. If a force is exerted on the transmission element 5 by a deploying airbag 6, then the clamp 13, which is arranged on the transmission element 5, is released from the two hinge carrier parts 10, 11, so that the moveable hinge carrier part 11 folds about the axis 12 and releases the spherical connecting element 3.

FIG. 7 shows a further embodiment. In this case, the hinge arm 2 has a deformation region 20 in which the hinge arm 2 can be deformed. If an airbag arranged under the engine hood is ignited, then the deformation region 20 of the hinge arm 2 is deformed, with the result that the connecting part 3 migrates out of a socket 100 on the hinge carrier 1 and thereby releases the connection. It migrates out owing to the shortening of the hinge arm 2 that is projected onto the socket 100. The opening movement is controlled by a lever 4 which moves in a coulisse 40 on the hinge carrier 1. As a result, a defined opening behavior can be achieved. A further possible coulisse guide, for example for the connecting part 3, is shown in the upper region of figure 7. In an initial position, the connecting part 3 is securely clamped in the region 41 of the coulisse guide behind a locking element 42. If an airbag is deployed, then the part 3 migrates on the path indicated by the arrow past a one-way flap 43 into the open position 45. After the accident, the hood can be brought down by pressing down from the region 45 past the one-way flap 43 again into a transportation position 44 in which a journey to the next workplace is possible.

FIG. 8 shows a further embodiment, in which the deployment of an airbag 6 acts again, via a transition element designed as a lever 5, on the bolt 3 in such a manner that, when the airbag 6 is deployed, the bolt is pulled back out of its connection. The airbag operates here in the form of a piston and is adjacent to piston-shaped caps 62.

FIG. 9 shows a particular embodiment of a suitable airbag 6. In this case, the airbag is positioned in the vehicle in such a manner that it is situated in the direct vicinity of the hinges of the engine hood. A gas lance 60, the outlet openings of which are likewise arranged in the direct vicinity of the hinges, is arranged in the airbag 6. If a gas for deploying the airbag 6 is generated by the gas generator 61, then, as shown in the second step in FIG. 9, the airbag region which is situated in the region of the hinges is inflated first of all. Only then is the remaining airbag deployed. The effect achieved by this is that preliminary forces occur initially in the region of the hinges, said forces enabling the hinge to be released and only then is the rest of the engine hood raised. This prevents the engine hood from unnecessarily vibrating.

The invention claimed is:

1. A hinge for connecting a hood to a vehicle body, having
at least one hinge carrier arranged on the vehicle body,
at least one hinge arm arranged on the hood, and
at least one connecting part for a pivotable connection of the at least one hinge arm to the at least one hinge carrier,
wherein the hinge is configured so that the pivotable connection of the at least one hinge arm to the at least one hinge carrier is released in an event of an accident by removal and/or destruction of the at least one connecting part due to forces acting in an axial direction of a pivot axis of the hinge.

2. The hinge as claimed in claim 1, wherein the at least one connecting part is guided in at least one socket on the at least one hinge arm and in at least one socket on the at least one hinge carrier and, in the event of an accident, is removed from at least one of the sockets.

3. The hinge as claimed in claim 2, wherein the at least one connecting part is designed as a bolt which is pulled out of the at least one of the sockets.

4. The hinge as claimed in claim 2, wherein at least one actuating device is provided for actuating the at least one connecting part in the event of an accident.

5. The hinge as claimed in claim 4, wherein the at least one actuating device comprises a pyrotechnic element.

6. The hinge as claimed in claim 4, wherein the at least one actuating device is an inflatable airbag and/or a gas-conducting element.

7. The hinge as claimed in claim 6, wherein the airbag and/or the gas-conducting element acts on the at least one connecting part via at least one transmission element.

8. The hinge as claimed in claim 7, wherein the at least one transmission element is designed as a lever.

9. The hinge as claimed in claim 7, wherein on filling with gas, the airbag and/or the gas-conducting element, owing to its expansion, exerts a push or a pull on the at least one connecting part and/or the at least one transmission element.

10. The hinge as claimed in claim 1, wherein the at least one hinge carrier has at least one socket which corresponds with the at least one connecting part and is configured to release the at least one connecting part in the event of an accident.

11. The hinge as claimed in claim 10, wherein the at least one hinge carrier has at least one moveable hinge carrier part which, in the event of an accident, is moved in relation to at least one fixed hinge carrier part in such a manner that the at least one connecting part accommodated therein comes free.

12. The hinge as claimed in claim 1, wherein the at least one hinge arm has a deformation region for a specific deformation of the at least one hinge arm in the event of an accident.

13. The hinge as claimed in claim 12, wherein the at least one connecting part is disengaged from the at least one hinge carrier by deformation of the at least one hinge arm.

14. The hinge as claimed in claim 1, wherein at least one limiting device is arranged for limiting relative movement between the at least one hinge carrier and at least one hinge arm.

15. The hinge as claimed in claim 14, wherein the at least one limiting device is a rebound strap and/or a lever guided in a coulisse.

16. A hinge for connecting a hood to a vehicle body, comprising:
at least one hinge carrier arranged on the vehicle body,
at least one hinge arm arranged on the hood, and
at least one connecting part for a pivotable connection of the at least one hinge arm to the at least one hinge carrier,
wherein the hinge is configured so that the pivotable connection of the at least one hinge arm to the at least one hinge carrier is released in an event of an accident by removal and/or destruction of the at least one connecting part, wherein the at least one connecting part is a shear bolt designed to shear off by forces used to raise the engine hood in the event of an accident such that connection between the hinge arm and the hinge carrier is eliminated or an explosive bolt.

17. An airbag for opening a hood connected by a hinge to a vehicle body wherein the airbag is configured to release the hood from the vehicle body using forces generated by the airbag that act in an axial direction of a pivot axis of the hinge when the airbag is deployed in a region of the hinge.

18. The airbag as claimed in claim 17, wherein airbag regions are arranged directly on the hinge.

19. The airbag as claimed in claim 18, wherein the airbag, when deployed, is first of all deployed in the airbag regions arranged on the hinge.

20. The airbag as claimed in claim 18, wherein a gas-conducting system is arranged in an interior of the airbag, and wherein the gas conducting system conducts gas used for the deployment into the airbag regions arranged on the hinge.

21. The airbags as claimed in claim 20, wherein the gas-conducting system is a gas lance.

22. The hinge as claimed in claim 16, wherein the at least one connecting part is the explosive bolt.

* * * * *